United States Patent [19]

Ito et al.

[11] Patent Number: 5,054,014
[45] Date of Patent: Oct. 1, 1991

[54] OPTICAL DISK RECORDING/REPRODUCING APPARATUS AND ROTARY DRIVE THEREFOR

[75] Inventors: Hiroyuki Ito; Hidekazu Hattori, both of Tokyo; Satoshi Kitani, Chiba, all of Japan

[73] Assignee: Sony Corporation, Tokyo, Japan

[21] Appl. No.: 467,527

[22] Filed: Jan. 19, 1990

[30] Foreign Application Priority Data

Feb. 15, 1989 [JP] Japan .................. 1-035665

[51] Int. Cl.[5] ........................................... G11B 19/12
[52] U.S. Cl. .................. 369/190; 369/239; 369/240
[58] Field of Search ............... 369/189, 190, 231, 236, 369/239, 240, 266, 267

[56] References Cited

U.S. PATENT DOCUMENTS

| | | | |
|---|---|---|---|
| 4,302,833 | 11/1981 | Tanaka | 369/239 |
| 4,388,713 | 6/1983 | Tatsuguchi | 369/189 |
| 4,623,939 | 11/1986 | Machida | 369/239 |
| 4,653,040 | 3/1987 | Senso | 369/190 |
| 4,672,595 | 6/1987 | Senso | 358/338 |
| 4,680,746 | 7/1987 | Senso | 369/240 |
| 4,796,249 | 1/1989 | Baas | 369/240 |

FOREIGN PATENT DOCUMENTS

| | | | |
|---|---|---|---|
| 0166564 | 10/1983 | Japan | 369/239 |
| 0013256 | 1/1989 | Japan | 369/239 |

*Primary Examiner*—Stuart S. Levy
*Assistant Examiner*—John Pokotylo
*Attorney, Agent, or Firm*—Alvin Sinderbrand; William S. Frommer

[57] ABSTRACT

An apparatus for rotationally driving an optical disk in an optical disk recording and/or reproducing apparatus capable of recording or reproducing signals from disks having different sizes includes a spindle motor for rotationally driving a disk, a servo unit for controlling the rotation of the spindle motor, and a control unit for detecting an activation response state of the spindle motor upon starting, and switching a gain of the servo unit on the basis of the detection result.

2 Claims, 4 Drawing Sheets

FIG. 4B1
FIG. 4B2

OPTICAL DISK RECORDING/REPRODUCING APPARATUS AND ROTARY DRIVE THEREFOR

BACKGROUND OF THE INVENTION

1) Field of the Invention

The present invention relates to a disk rotary driving apparatus for an optical disk reproducing apparatus or the like and, more particularly, to a disk rotary driving apparatus in an optical disk reproducing apparatus for a compact disk player or the like, capable of reproducing a plurality of types of disks having different sizes.

2) Description of the Prior Art

In a conventional disk rotary driving apparatus in an optical disk reproducing apparatus of the reproduction-only type, such as a CD-ROM disk player or a compact disk player, the rotation of a spindle motor is phase-controlled on the basis of a phase comparison signal between a clock signal separated from a reproduction signal obtained by an optical pickup and a predetermined reference signal.

In this manner, in a compact disk player, a spindle motor and its driver together constitute a PLL (phase locked loop) circuit, thereby rotationally driving a compact disk with high precision.

Optical disks are provided in various diameter sizes, for example, a compact disk can have one of two diameters: 8 (cm) and 12 (cm).

Therefore, the weight of the object that is rotationally driven as a load on the spindle motor changes depending on whether a compact disk having a diameter of 8 (cm) or 12 (cm) is driven.

Accordingly, in a compact disk player for reproducing signals from either of two types of compact disks each having a diameter of 8 (cm) or 12 (cm), the servo gain of a PLL circuit must be automatically switched in accordance with the type of compact disk to be driven. Therefore, various detecting methods are used to detect the disk size of the loaded compact disk.

In a first detecting method, a photoreflector is arranged at a predetermined position in an optical disk reproducing apparatus. The diameter of a loaded optical disk is determined in accordance with the presence or absence of light reflected by the optical disk. In this manner, the disk size is detected.

In a second method, a photointerruptor, instead of a photoreflector, is arranged at a predetermined position in an optical disk reproducing apparatus. As in the first method, the size of a loaded optical disk is detected in accordance with whether light from the photointerruptor is interrupted by the optical disk.

In a third detecting method, mechanical contacts are arranged at a predetermined position in an optical disk reproducing apparatus. As in the first and second methods, the type of optical disk is detected in accordance with the ON/OFF state of the contacts.

In a fourth detecting method, a reproduction light beam is radiated from an optical pickup in an optical disk reproducing apparatus onto a loaded optical disk. The optical pickup detects the presence or absence of a reflected light beam, thereby detecting the type of the loaded optical disk as in the above methods.

Accordingly, one of the above detecting methods is selected in designing an optical disk player. The servo gain of the PLL circuit of the spindle motor is switched on the basis of the detection result obtained by the selected method.

In the first to third detecting methods, however, a mechanism must be provided exclusively for detecting the disk size of a loaded optical disk. Therefore, such an arrangement for an optical disk reproducing apparatus such as a compact disk player is complicated.

In addition, in order to reproduce signals from an 8-cm size compact disk in a compact disk player capable of accommodating only a 12-cm size compact disk, an adaptor, consisting of a synthetic resin or the like, can be mounted on the outer circumference of the 8-cm disk.

In this case, since an 8-cm size compact disk with an adaptor mounted on its outer circumference is rotationally driven, the spindle motor of the compact disk player must be phase-controlled with a servo gain similar to that used to rotationally drive a 12-cm compact disk.

Since, however, the adaptor is not able to reflect light, the loaded compact disk is detected as an 8-cm compact disk by the above-described first and fourth detecting methods. Therefore, the spindle motor is phase-controlled with a servo gain for driving an 8-cm compact disk, resulting in an insufficient servo gain.

In addition, some compact disks have a transparent outer circumference. In this case, in the first, second, and fourth detecting methods, the presence of an 8-cm compact disk may be erroneously detected although a 12-cm compact disk is loaded.

SUMMARY OF THE INVENTION

The present invention has been made in consideration of the above-described disadvantages of the prior art and has an object of providing a disk rotary driving apparatus capable of reliably adjusting a servo gain thereof using a simple arrangement.

In order to solve the above problems, according to the present invention, an apparatus for rotationally driving a disk in an optical disk reproducing apparatus capable of reproducing signals from disks of a plurality of disk sizes comprises an activating means for activating a spindle motor for rotationally driving the disk and means for detecting an activation response state of the spindle motor. On the basis of a detection result obtained by the detecting means, the size of the object that is driven by the spindle motor is detected.

With the above arrangement, since the activation response state of the spindle motor is detected upon starting, the type of object which is rotationally driven by the spindle motor can be detected.

BRIEF DESCRIPTION OF THE DRAWINGS

FIGS. 2A to 2B2 are timing charts providing signal waveforms for explaining the operation of the embodiment shown in FIG. 1;

FIGS. 4A to 4B2 are timing charts providing signal waveforms for explaining the operation of the second embodiment shown in FIG. 3.

DETAILED DESCRIPTION OF THE PREFERRED EMBODIMENTS

An embodiment of the present invention in which an apparatus for rotationally driving a disk in a compact disk player is described below with reference to the accompanying drawings.

Figure 1:
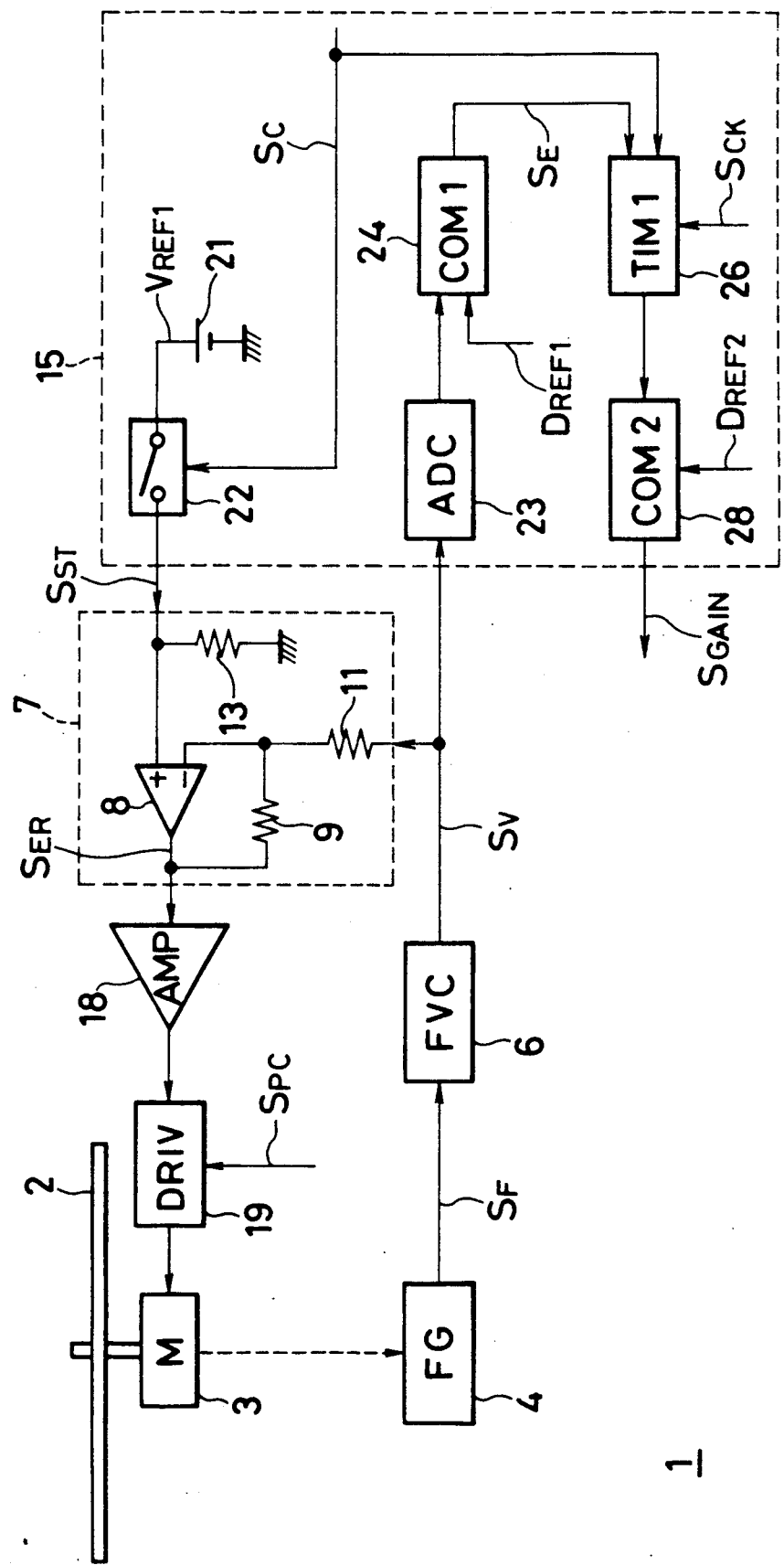
FIG. 1 is a block diagram showing a compact disk player according to an embodiment of the present invention.

Referring to FIG. 1, reference numeral 1 denotes an overall arrangement of a compact disk player. In the compact disk player 1, a compact disk 2 is rotationally driven by a spindle motor (M) 3. Information recorded in the compact disk 2 is read by an optical pickup unit (not shown) which is provided in a main body of the disk player 1 so as to move along the radial direction of the disk. Reference numeral 4 denotes a frequency generator (FG) for producing a rotational speed detection signal $S_F$ having a frequency which increases in proportion to the rotational speed of the spindle motor 3. Reference numeral 6 denotes a frequency to voltage converter (FVC) for converting the rotational speed detection signal $S_F$ from the frequency generator 4 into a voltage and producing an output signal $S_V$ having a voltage which changes in proportion to the rotational speed of the compact disk 2. Reference numeral 8 denotes an operational amplifier; 9, a feedback resistor; and 11 and 13, input resistors. The operational amplifier 8, the feedback resistor 9, and the input resistors 11 and 13 constitute a differential amplifier 7. The operational amplifier 8 receives at its inverting input terminal the output signal $S_V$ from the frequency to voltage converter 6 and receives at its non-inverting input terminal an activation signal $S_{ST}$ from a controller 15 (described hereinbelow). The operational amplifier 8 outputs an error signal $S_{ER}$ of the output signal $S_V$ from the frequency to voltage converter 6 with respect to the activation signal $S_{ST}$. The error signal $S_{ER}$ is supplied to an amplifier (AMP) 18. Reference numeral 19 denotes a driver (DRIV) for driving the spindle motor 3 on the basis of the error signal $S_{ER}$ amplified by the amplifier 18. In this arrangement, the spindle motor 3, the frequency generator 4, the frequency to voltage converter 6, the operational amplifier 8, the amplifier 18 and the driver 19 constitute a servo loop.

The spindle motor 3, therefore, is activated such that the output signal $S_V$ follows the activation signal $S_{ST}$.

Figure 2:
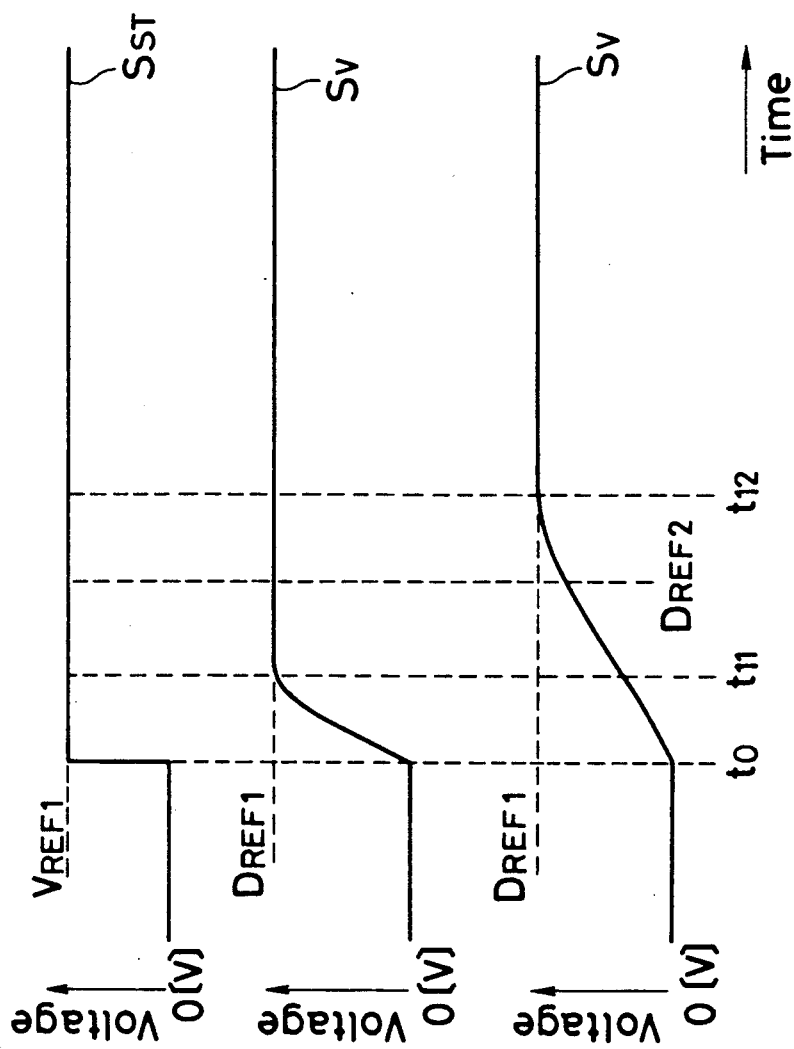

With reference also to FIGS. 2A to 2B2, the controller 15 comprises: a switch circuit 22 which is switched on the basis of a control signal $S_C$ when a reproduction operation member is operated; an analog/digital converter (ADC) 23 for converting the output signal $S_V$ from the frequency to voltage converter 6 into a digital signal; a comparator (COM1) 24 for comparing the output signal $S_V$ converted into a digital signal by the analog/digital converter 23 with a predetermined reference level $D_{REF1}$ and raising the signal level of an output signal $S_E$ of the comparator 24 when the output signal $S_V$ rises higher than a voltage level determined by the reference level $D_{REF1}$; a timer circuit (TIM1) 26 which is reset at the same time to that the switch circuit 22 is switched on by the control signal $S_C$ and counts a predetermined clock signal during a feedback period from the time it is reset to a time $t_{11}$ or $t_{12}$ at which the signal level of the output signal $S_E$ rises; and a comparator (COM2) 28 which obtains the count of the timer circuit 26 when the signal level of the output signal $S_E$ rises and compares the count with a predetermined reference level $D_{REF2}$.

When an 8-cm compact disk body alone is driven, a relatively small count is obtained from the timer circuit 26. When a 12-cm compact disk or an 8-cm compact disk with an adaptor is driven, a relatively large count is obtained from the timer circuit 26. When a 12-cm compact disk or an 8-cm compact disk with an adaptor is driven, the comparator 28 raises a servo gain switch signal $S_{GAIN}$.

In the present embodiment, the spindle motor 3 is activated by following the change of state of the activation signal $S_{ST}$ and the rotational speed of an output shaft of the spindle motor 3 is gradually increased.

As described above, the response to activation of the spindle motor 3 changes in accordance with the weight of the compact disk 2 rotationally driven by the spindle motor 3. That is, a 12-cm compact disk or an 8-cm compact disk fixed to an adaptor is heavier than an 8-cm compact disk body alone. For this reason, when the 12-cm disk or 8-cm disk and adaptor are driven rotationally, the increase in the rotational speed of the output shaft of the spindle motor 3 is delayed.

When an 8-cm compact disk body alone is driven, the output signal $S_V$ rises to a predetermined voltage within a relatively short time period as shown in FIG. 2B1. When a 12-cm compact disk or an 8-cm compact disk fixed to an adaptor is driven, however, the rise in the output signal $S_V$ is delayed as shown in FIG. 2B2.

In this embodiment, therefore, the time period required for the output signal $S_V$ to rise to a predetermined voltage is detected to detect the activation response of the spindle motor 3, thereby switching the servo gain on the basis of the detection result.

That is, the controller 15 converts the output signal $S_V$ into a digital signal in the A/D converter 23 and supplies the converted output signal $S_V$ to the comparator 24, compares the output signal $S_V$ with the reference data $D_{REF1}$ in the comparator 24, and outputs the output signal $S_E$ indicating that the output signal $S_V$ exceeds the voltage determined by the reference level $D_{REF1}$. At the same time, the controller 15 counts a predetermined clock signal $S_{CK}$ for a time $t_{11}$ or $t_{12}$ at which the output signal $S_E$ rises in the timer circuit 26, and compares the count with the predetermined reference level $D_{REF2}$ in the comparator 28. For this reason, when a 12-cm compact disk or an 8-cm compact disk with an adaptor is to be rotationally driven, the servo gain switch signal $S_{GAIN}$ is output.

In this embodiment, a phase comparison signal $S_{PC}$ between a clock signal separated from a reproduction signal and a predetermined reference signal is output together with an output signal from the amplifier 18 to the driver 19. When the servo gain switch signal $S_{GAIN}$ rises, the signal level of the phase comparison signal to be output to the driver 19 is raised, thereby increasing the servo gain of the PLL circuit.

When the spindle motor 3 drives a heavy object, therefore, the spindle motor 3 is phase-controlled by a larger servo gain, thereby reliably reproducing an audio signal.

A conventional compact disk player of this type includes the frequency generator 4, the frequency to voltage converter 6 and the like in order to activate the spindle motor 3. According to this embodiment, however, an object to be rotationally driven by the spindle motor 3 can be reliably detected by only adding the timer circuit 26 and the like on a circuit board.

Unlike in a conventional apparatus, therefore, the type of object to be driven can be detected without a mechanism such as a photoreflector or a photointerruptor provided solely for that purpose. As a result, the arrangement of the compact disk player 1 as a whole can be simplified.

In addition, the type of the rotationally driven object is detected on the basis of the activation response of the spindle motor 3 which changes in accordance with the object. Therefore, erroneous detection caused by a conventional apparatus can be prevented, thereby reliably switching the servo gain.

In this embodiment, as described above, the frequency generator 4, the frequency to voltage converter 6 and the controller 15 constitute a detector for detecting the activation response of the spindle motor 3. The frequency generator 4, the frequency to voltage converter 6, the operational amplifier 8, the resistors 9, 11 and 13, the controller 15, the amplifier 18 and the driver 19 constitute an activating circuit for activating the spindle motor 3.

With this arrangement, the time period required for the output signal $S_V$ to rise to a predetermined voltage (that is, a voltage determined by the reference level $D_{REF1}$) is detected to detect the activation response of the spindle motor 3. Therefore, the type of object to be rotationally driven by the spindle motor 3 can be reliably detected with a simple arrangement. In addition, the servo gain of the PLL circuit can be switched to reliably reproduce an audio signal.

FIGS. 3 and 4A to 4B2 illustrate a second embodiment of the present invention. In the second embodiment, the spindle motor 3 is activated at a time $t_0$, and an output voltage $S_V$ is detected at a time $t_3$ after a predetermined period of time elapses, thereby detecting an activation response of the spindle motor 3.

That is, in a controller 35, a timer circuit (TIM2) 36 is reset at time $t_0$ (FIG. 4A) on the basis of a control signal $S_C$ and then counts a predetermined clock signal $S_{CK}$.

When the count reaches a predetermined value, the timer circuit 36 outputs a latch signal $S_R$ to a latch circuit (LCH) 37, thereby loading a digital value of the output signal $S_V$ (FIGS. 4B1 and 4B2) into the latch circuit 37 at the time $t_3$.

When a 12-cm compact disk or an 8-cm compact disk fixed to an adaptor is to be driven, therefore, data having a relatively small value is latched by the latch circuit 37. To the contrary, when an 8-cm compact disk body alone is to be driven, data having a relatively large value is latched by the latch circuit 37.

A comparator (COM3) 38 discriminates the magnitude of the data stored in the latch circuit 37 on the basis of a predetermined reference level $D_{REF3}$ and outputs the discrimination result as a servo gain switch signal $S_{GAIN}$.

Figure 3:
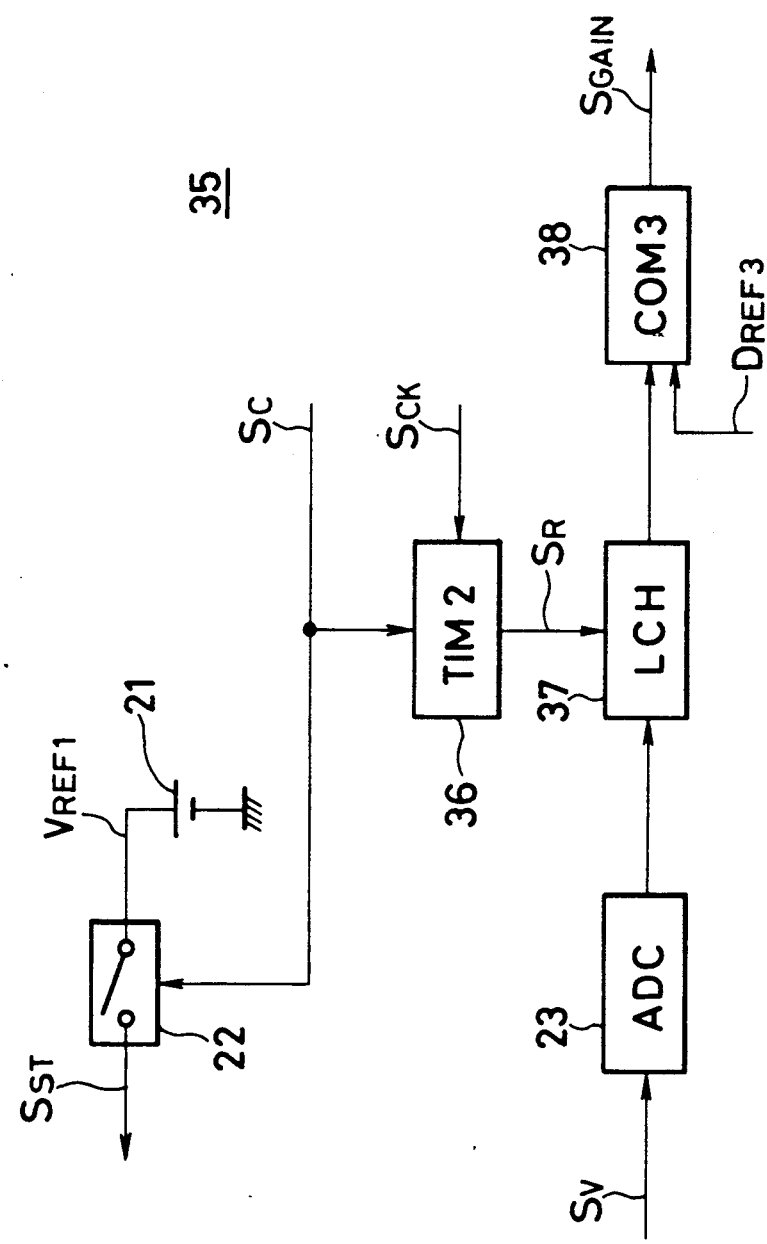
FIG. 3 is a block diagram showing a controller according to a second embodiment of the present invention.
Figure 4A:
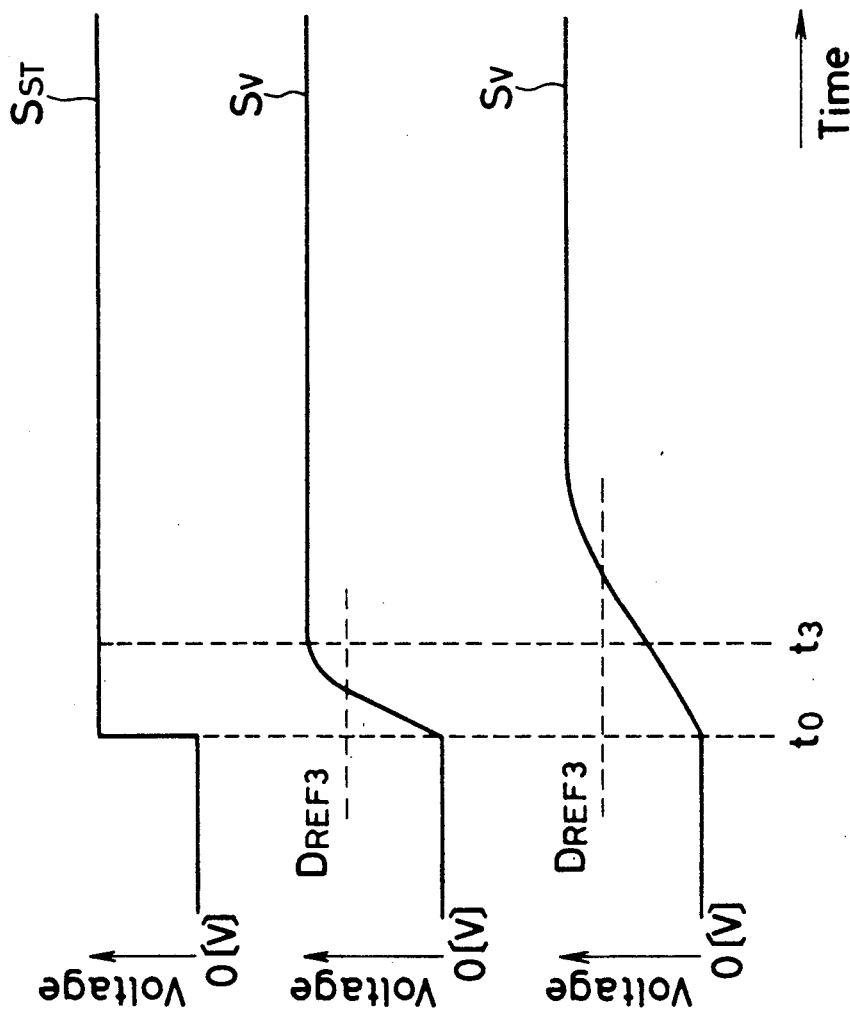

According to the arrangement shown in FIG. 3, the output voltage $S_V$ is detected when a predetermined period of time elapses after the spindle motor 3 is activated, thereby detecting the activation response of the spindle motor 3. The same effect as in the first embodiment can be obtained in this arrangement.

Note that the arrangement of the second embodiment with the exception of the control circuit 35 is the same as the first embodiment and a detailed description thereof is consequently omitted.

In the above embodiments, the output voltage $S_V$ from the frequency to voltage converter 6 is provided to the controller 15 or 35 to detect the activation response of the spindle motor 3. The present invention, however, is not limited to the above embodiments. For example, the output signal from the frequency generator 4 may be provided directly to the controller to detect the activation response.

In addition, in the above embodiments, the controller is constituted by a timer circuit and the like. The present invention, however, is not limited to the above embodiments. For example, the controller may be constituted by a microcomputer.

Furthermore, in the above embodiments, the type of the object which is rotationally driven is detected, and the servo gain of the PLL circuit is switched on the basis of the detection result. The present invention, however, is not limited to an arrangement in which the servo gain is switched but can be widely applied to an arrangement in which the type of the object to be rotationally driven is displayed and the like.

Moreover, in the above embodiments, the present invention is applied to a compact disk player. The present invention, however, is not limited to a compact disk player but is widely applicable in a disk rotary driving apparatus for an optical disk reproducing signals stored in apparatus for reproducing a compact disk or in a video disk as well as in an optical disk recording apparatus for optically recording signals in an optical disk.

As has been described above, according to the present invention, an object to be rotationally driven by a spindle motor 3 is detected on the basis of an activation response of the spindle motor. Therefore, a disk rotary driving apparatus capable of reliably detecting the type of object which is rotationally driven can be obtained with a simple arrangement.

What is claimed is:

1. An apparatus for rotationally driving a disk comprising:
   a spindle motor for rotationally driving a disk;
   servo means for controlling the rotation of said spindle motor and having an adjustable gain; and
   control means for detecting a response of said spindle motor upon activation thereof, and adjusting the gain of said servo means on the basis of said response;
   said control means including means for activating said spindle motor, and rotational speed detecting means including means for receiving an analog signal proportional to the rotation of said spindle motor, analog/digital converting means for converting said analog signal proportional to the rotation of said spindle motor to a digital output signal, latching means for latching said digital output signal from said analog/digital converting means in response to a latch signal, means for producing an activation signal indicating the activation of said spindle motor, timer means for counting a clock signal on the basis of said activation signal and outputting said latch signal to said latching means when a count of said clock signal reaches a predetermined value, comparing means for comparing said digital signal latched by said latching means with a reference value to produce a comparison output, and means for producing a control signal for switching the gain of said servo means on the basis of the comparison output from said comparing means.

2. An apparatus for recording signals on and/or reproducing signals from an optical disk comprising:
   a spindle motor for rotationally driving an optical disk; and
   means for detecting a response of said spindle motor upon activation thereof, and determining the type of said optical disk on the basis of the detected response;
   said means for detecting including rotational speed detecting means for detecting a signal representing a rotational speed of said spindle motor when a predetermined period of time has elapsed after said spindle motor is activated and which comprises means for receiving a signal proportional to the rotation of said spindle motor, analog/digital converting means for converting said signal proportional to the rotation of said spindle motor to a digital signal, latching means for latching said digital signal upon receipt of a latch signal, timer means for counting a clock signal upon activation of said spindle motor and outputting said latch signal when the count reaches a predetermined value, and comparing means for comparing said digital signal latched by said latching means with a reference value and producing a signal indicating the type of said disk on the basis of the comparison result.

* * * * *